(12) United States Patent
Lee

(10) Patent No.: US 12,280,687 B2
(45) Date of Patent: Apr. 22, 2025

(54) METHOD OF CONFIGURING LATERAL WIRELESS CHARGING CHAIN FOR ELECTRIC VEHICLE AND APPARATUS AND SYSTEM THEREFOR

(71) Applicant: HYUNDAI MOBIS CO., LTD., Seoul (KR)

(72) Inventor: Jae Young Lee, Icheon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 365 days.

(21) Appl. No.: 17/864,569

(22) Filed: Jul. 14, 2022

(65) Prior Publication Data

US 2023/0166616 A1 Jun. 1, 2023

(30) Foreign Application Priority Data

Nov. 26, 2021 (KR) .................. 10-2021-0166033

(51) Int. Cl.
| | |
|---|---|
| B60L 53/38 | (2019.01) |
| B60L 53/12 | (2019.01) |
| B60L 53/36 | (2019.01) |
| B60L 53/37 | (2019.01) |
| G06T 7/70 | (2017.01) |
| H02J 7/34 | (2006.01) |
| H02J 50/12 | (2016.01) |
| H02J 50/80 | (2016.01) |

(Continued)

(52) U.S. Cl.
CPC .............. *B60L 53/38* (2019.02); *B60L 53/12* (2019.02); *B60L 53/36* (2019.02); *B60L 53/37* (2019.02); *G06T 7/70* (2017.01); *H02J 7/342* (2020.01); *H02J 50/12* (2016.02); *H02J 50/80* (2016.02); *H02J 50/90* (2016.02); *B60L 2240/62* (2013.01); *G06T 2207/30252* (2013.01); *G06V 10/764* (2022.01); *G06V 20/58* (2022.01); *G06V 20/70* (2022.01); *H02J 50/60* (2016.02); *H04N 5/2628* (2013.01)

(58) Field of Classification Search
None
See application file for complete search history.

(56) References Cited

U.S. PATENT DOCUMENTS

| | | | |
|---|---|---|---|
| 2016/0129793 A1* | 5/2016 | Cronie .................... | H02J 50/90 320/109 |
| 2017/0136881 A1* | 5/2017 | Ricci ........................ | B60L 5/24 |

(Continued)

FOREIGN PATENT DOCUMENTS

KR 10-2201290 B1 1/2021

OTHER PUBLICATIONS

Extended European Search Report Issued on Jan. 9, 2023, in counterpart European Patent Application No. 22184744.5 (7 Pages in English).

*Primary Examiner* — Peter D Nolan
*Assistant Examiner* — Michael F Whalen
(74) *Attorney, Agent, or Firm* — NSIP Law

(57) ABSTRACT

A method of configuring a lateral wireless charging chain by a first vehicle includes detecting a second vehicle in which a lateral wireless charging chain is configurable, calculating a distance to the second vehicle, performing based on the calculated distance being within a first distance, lateral alignment control with the second vehicle, and performing based on the calculated distance being within a second distance, longitudinal alignment control with the second vehicle.

18 Claims, 10 Drawing Sheets

(51) Int. Cl.
   *H02J 50/90*   (2016.01)
   *G06V 10/764*  (2022.01)
   *G06V 20/58*   (2022.01)
   *G06V 20/70*   (2022.01)
   *H02J 50/60*   (2016.01)
   *H04N 5/262*   (2006.01)

(56) References Cited

U.S. PATENT DOCUMENTS

2020/0009982 A1* 1/2020 Kim ................... G05D 1/0217
2020/0361482 A1  11/2020 Choi et al.
2023/0182599 A1* 6/2023 Landgraf ............... B60L 53/53
                                                            320/109

\* cited by examiner

FIG.5
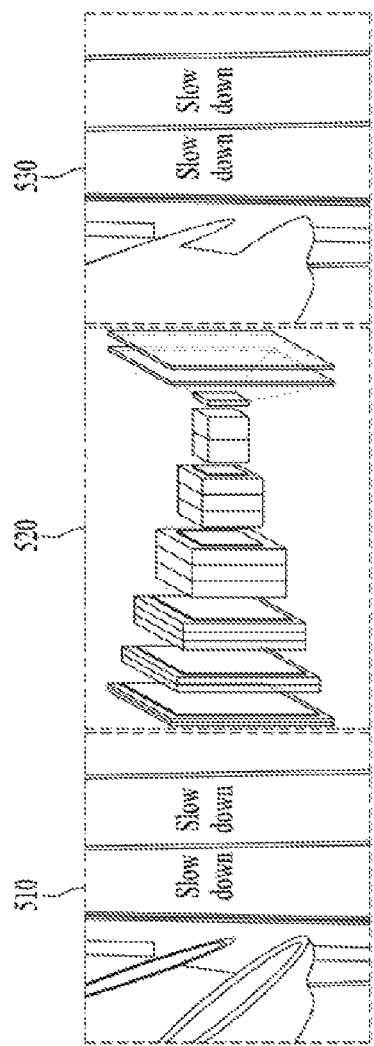
(a) Method of recognizing wirelessly charged vehicle using semantic segmentation Network
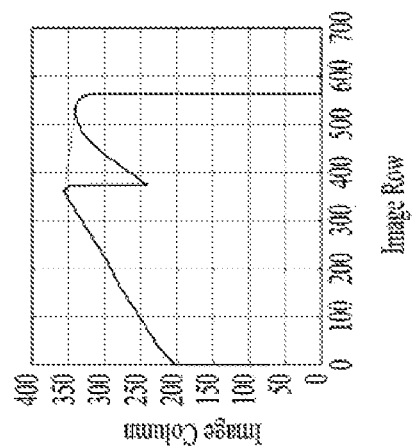
(b) Method of estimating stopped angle of wirelessly charged vehicle

METHOD OF CONFIGURING LATERAL WIRELESS CHARGING CHAIN FOR ELECTRIC VEHICLE AND APPARATUS AND SYSTEM THEREFOR

CROSS-REFERENCE TO RELATED APPLICATIONS

This application claims the benefit under 35 USC 119(a) of Korean Patent Application No. 10-2021-0166033, filed on Nov. 26, 2021 in the Korean Intellectual Property Office, the entire disclosure of which is incorporated herein by reference for all purposes.

BACKGROUND

1. Field

The present disclosure relates to wireless charging technology for electric vehicles, and more particularly, to a technology for configuring a lateral wireless charging chain by aligning electric vehicles equipped with wireless power transmission/reception pads for wireless charging.

2. Discussion of the Related Art

As the spread of electric vehicles is invigorated, interest in electric vehicle charging is increasing. In the current electric vehicle charging system, electric vehicles are charged by connecting a dedicated charging plug provided at a separate charging station or in a house/parking lot to the electric vehicles.

However, charging an electric vehicle takes more time than a general refueling method, and there are difficulties in charging because sufficient charging stations have not been secured.

Accordingly, recently, interest in wireless charging of electric vehicles as an alternative to the existing charging stations is increasing.

According to the method of wireless charging of electric vehicles, when a vehicle equipped with a wireless charging reception pad is placed on a wireless power transmission pad buried in the ground and current is applied to the wireless power transmission pad, electric energy is transmitted to the wireless charging reception pad of the vehicle by inducing magnetic resonance to charge the battery provided in the vehicle.

The wireless charging method for electric vehicles is subjected to spatial restrictions compared to the conventional plug-based charging method.

However, in the case of wireless charging of vehicles waiting for a signal at an intersection, wireless power transmission pads as many as the number of electric vehicles waiting for a signal at the intersection are required to be buried in the road.

In particular, since the number of required wireless power transmission pads varies according to a change in traffic volume over time, it is difficult to efficiently manage the transmission pads.

Further, when many wireless power transmission pads are buried in the road, maintenance of the transmission pads is not easy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of configuring a lateral wireless charging chain by a first vehicle includes detecting a second vehicle in which a lateral wireless charging chain is configurable, calculating a distance to the second vehicle, performing based on the calculated distance being within a first distance, lateral alignment control with the second vehicle, and performing based on the calculated distance being within a second distance, longitudinal alignment control with the second vehicle.

The method may further include measuring a position and angle of the second vehicle using an image from a surround view monitor (SVM) front camera. The lateral alignment control with the second vehicle may be performed based on the measured position and angle.

The method may further include transforming the image into a bird's eye view image and classifying an object in a pixel level by inputting the transformed image to a semantic segmentation network. The position and the angle of the second vehicle may be measured based on a result of the classification of the object.

The angle of the second vehicle may be determined based on a slope of a straight line connecting maximum or minimum inflection points of pixels of the second vehicle classified into the object.

The method may further include determining, based on the distance to the second vehicle being within the first distance, whether an obstacle is present between the first vehicle and the second vehicle based on the result of the classification of the object, and decreasing, based on absence of the obstacle, a number of transmission pulses of a smart parking assistance system (SPAS) sensor.

The method may further include measuring, based on the number of transmission pulses being decreased, a reverberation distance of the SPAS sensor; and setting a short-range measurement limit distance based on the reverberation distance.

The distance to the second vehicle may be measured using any one or any combination of any two or more of a surround view monitor (SVM) front camera, an ultrasonic sensor, and Light Detection and Ranging (LiDAR).

The method may further include inputting, based on the distance to the second vehicle being within the second distance, an image from a surround view monitor (SVM) side camera to a semantic segmentation network and classifying objects in a pixel level. The longitudinal alignment control may be performed by comparing a lateral average position of a specific object, among the classified objects, with a lateral resolution center of the image from the SVM side camera.

The performing of the longitudinal alignment control may include controlling, based on the lateral average position being greater than ½ of lateral pixels corresponding to the image, the first vehicle to move rearward, and controlling, based on the lateral average position being less than or equal to ½ of the lateral pixels corresponding to the image, the first vehicle to move forward.

The specific object may be an object equipped with an inter-vehicle power transmission/reception pad.

The inter-vehicle power transmission/reception pad may be mounted on one of a side-view mirror, a side door, or a tire wheel.

Based on the inter-vehicle power transmission/reception pad being mounted on the side-view mirror, the lateral alignment control may be performed until a distance between a side-view mirror of the first vehicle and a side-view mirror of the second vehicle reaches a short-range measurement limit distance.

The first distance may be longer than the second distance.

The method may further include acquiring information about the second vehicle through Vehicle to Everything (V2X) communication. The information about the second vehicle may include any one or any combination of any two or more of information about a vehicle type, information about a current location, information about either one or both of a battery charge level and a battery output voltage, information about a position where an inter-vehicle power transmission/reception pad is mounted, information about whether either one or both of a lateral and longitudinal wireless charging chain is configurable with a target vehicle, and information about whether wireless charging is being performed.

The method may further include receiving, based on inter-vehicle power transmission/reception pads of the first vehicle and the second vehicle being aligned through the longitudinal alignment control, wireless power through negotiation with the second vehicle and charging a battery provided in the first vehicle.

In another general aspect, a non-transitory computer-readable storage medium storing instructions that, when executed by one or more processors, configure the one or more processors to perform operations for configuring a lateral wireless charging chain in a vehicle operatively connected to another vehicle over a communication network, the operations include: detecting the other vehicle in which a lateral wireless charging chain is configurable; calculating a distance to the other vehicle; performing, based on the calculated distance being within a first distance, lateral alignment control with the other vehicle; and performing, based on the calculated distance being within a second distance, longitudinal alignment control with the other vehicle.

In another general aspect, an electric vehicle configured for wireless charging, includes a vehicle terminal configured to communicate with another vehicle; a vehicle sensor comprising at least one sensor to measure a distance to the other vehicle, and a position and an angle of the other vehicle; and an electric vehicle (EV) charging device configured to: based on detecting in operative connection with the vehicle terminal that a lateral wireless charging chain is configurable with the other vehicle, calculate the distance to the other vehicle in operative connection with the vehicle sensor; and perform lateral alignment control and longitudinal alignment control with the other vehicle based on the calculated distance.

Based on the distance to the other vehicle being within a first distance, the EV charging device may perform the lateral alignment control. Based on the distance to the other vehicle being within a second distance, the EV charging device may perform the longitudinal alignment control. The first distance may be longer than the second distance.

The vehicle sensor may include any one or any combination of any two or more of a surround view monitor (SVM) front camera, Light Detection and Ranging (LiDAR), and an ultrasonic sensor. The distance to the other vehicle may be calculated using any one or any combination of any two or more of the SVM front camera, the ultrasonic sensor, or the LiDAR. The EV charging device may measure the position and angle of the other vehicle using the SVM front camera, and perform the lateral alignment control with the other vehicle based on the measured position and angle.

Other features and aspects will be apparent from the following detailed description, the drawings, and the claims.

BRIEF DESCRIPTION OF THE DRAWINGS

FIG. 5 illustrates a method of estimating the position and angle of a vehicle being wirelessly charged in the front based on an image captured by an SVM front camera according to an embodiment.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
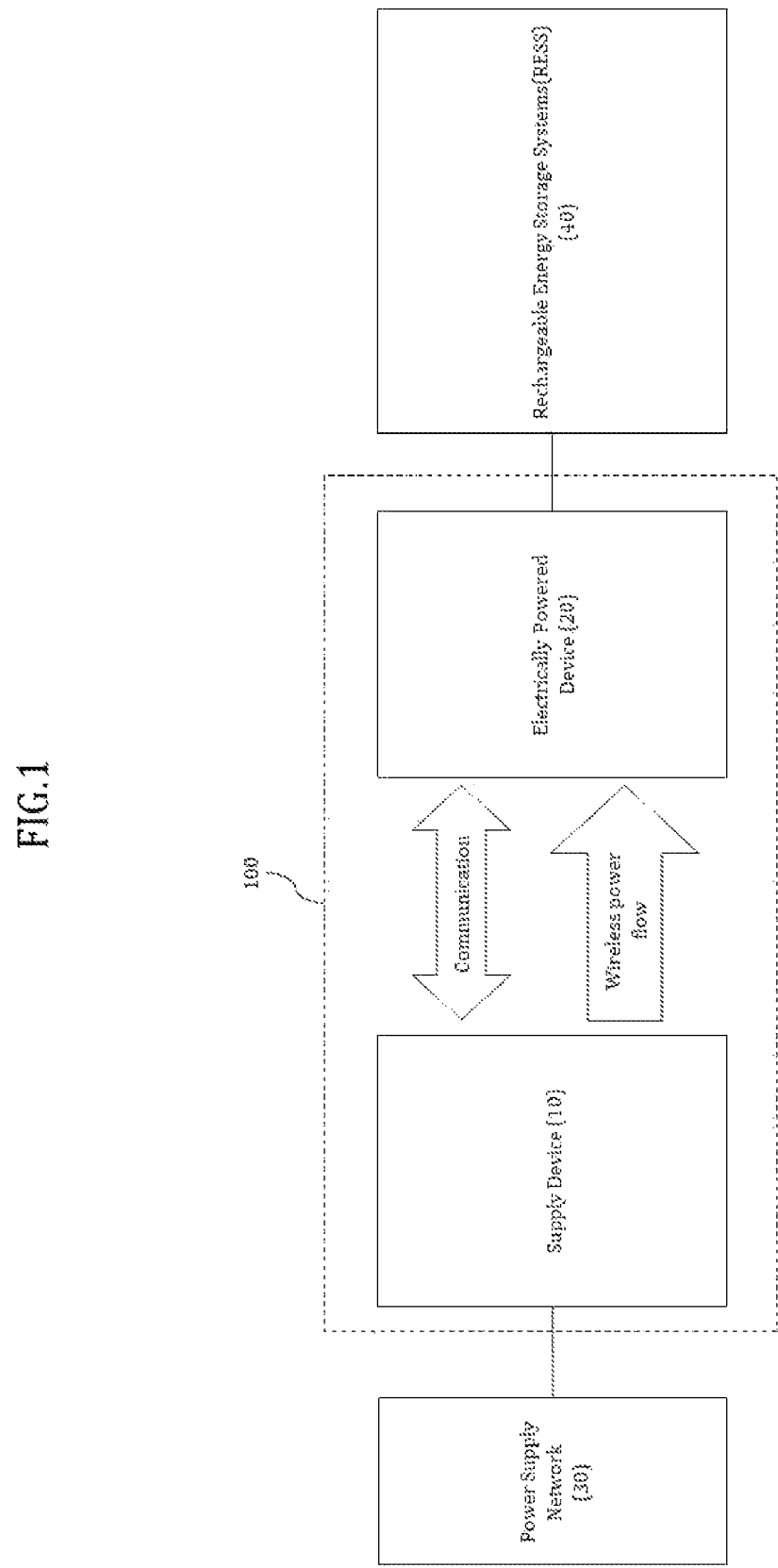
FIG. 1 is a diagram illustrating the overall structure of a wireless power transmission system according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

An object of the present disclosure is to provide a method of configuring a lateral wireless charging chain by aligning electric vehicles equipped with wireless power transmission/reception pads, and an apparatus and system for the same.

Another object of the present disclosure is to provide a method of configuring a lateral wireless charging chain capable of simultaneously charging multiple electric vehicles with one wireless power supply device.

Another object of the present disclosure is to provide a cost-effective wireless charging system for electric vehicles by flexibly configuring a lateral wireless charging chain.

Another object of the present disclosure is to provide a wireless charging system for electric vehicles that is easy to maintain.

Another object of the present disclosure is to provide a wireless charging system capable of wirelessly charging multiple electric vehicles simultaneously through one supply device while the electric vehicles are temporarily stopped or parked at an intersection, thereby effectively addressing issues related to the capacity and weight of batteries of the electric vehicles and efficiently reducing the initial cost of investment in facilities.

In addition, the present disclosure may provide a method of configuring a lateral wireless charging chain capable of simultaneously charging multiple electric vehicles through one wireless power supply device.

In addition, according to the present disclosure, a cost-effective wireless charging system for electric vehicles may be provided by flexibly configuring a lateral wireless charging chain.

In addition, according to the present disclosure, a wireless charging system for electric vehicles is easy to maintain.

In addition, according to the present disclosure, multiple electric vehicles may be wirelessly charged through one supply device in the form of a lateral chain while the electric vehicles are temporarily stopped or parked at an intersection. Accordingly, issues related to the capacity and weight of batteries of the electric vehicles may be effectively addressed and the initial cost of investment in facilities may be efficiently reduced.

Hereinafter, embodiments of the present disclosure will be described in detail with reference to FIGS. 1 to 10.

FIG. 1 is a diagram illustrating the overall structure of a wireless power transmission system according to an embodiment.

Referring to FIG. 1, a wireless power transmission system 100 may include a supply device 10 and an electric vehicle (EV) charging device 20.

The supply device 10 may convert AC (or DC) electrical energy supplied from a power supply network 30 into AC electrical energy required by the EV charging device 20, and then transmit the converted AC electrical energy to the EV charging device 20 using a predetermined wireless energy transmission method.

The supply device 10 and the EV charging device 20 may be wirelessly connected to exchange various kinds of information for wireless power transmission.

The EV charging device 20 may rectify the wireless power received from the supply device 10 and then supply the power to in-vehicle, that is, on-board rechargeable energy storage systems (RESS) to charge the battery for driving the vehicle.

The supply device 10 according to the embodiment may be buried in/installed on a road, a parking lot, etc., but this is merely one embodiment. The supply device 10 may be installed on a wall or configured in the air.

The EV charging device 20 may be mounted on one side of a lower part of the vehicle. However, this is merely one embodiment. The electrically powered device may be mounted on one side of the front/rear bumper of the vehicle, one side of the left/right rear mirror of the vehicle, or one side of an upper part of the vehicle according to the design by those skilled in the art.

The supply device 10 according to the embodiment may be operatively connected to other supply devices by a wired or wireless communication system.

The EV charging device 20 according to the embodiment may be operatively connected to another EV charging device by a wireless communication system. To this end, the EV charging device 20 may be connected to a vehicle terminal (not shown) over an in-vehicle communication network. For example, the wireless communication system may be a multiple access system that supports communication with multiple users by sharing an available system resource (e.g., bandwidth, transmit power, etc.). Examples of the multiple access system may include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

The EV charging device 20 according to the embodiment may be connected to another supply device by wireless communication. As an example, the EV charging device 20 may be connected to multiple supply devices 10. In this case, the EV charging device 20 may receive wireless power from the supply devices 10 simultaneously. Based on the wireless charging efficiency between the EV charging device 20 and the supply devices 10, the EV charging device 20 may dynamically determine at least one supply device 10 to receive power.

The EV charging device 20 according to the embodiment may serve as a power relay to transmit power received from the supply device 10 to another EV charging device. In this case, the EV charging device 20 may include a wireless power receiver configured to receive wireless power and a wireless power transmitter configured to transmit wireless power. The wireless power receiver and the wireless power transmitter may be mounted at different positions in the vehicle, but this is merely one embodiment. The wireless power receiver and wireless power transmitter may be configured as one module and mounted. As an example, a wireless power receiver to receive power from the supply device 10 may be disposed on one side of the lower part of the vehicle, and a wireless power receiver to receive power from a wireless power transmitter of another vehicle may be disposed at the center of the front bumper of the vehicle. Also, a wireless power transmitter to wirelessly transmit power to another vehicle may be disposed at the center of the rear bumper of the vehicle. As another example, an integrated module implemented to enable wireless power transmission and reception (hereinafter, referred to as an "integrated transceiver" for simplicity) may be disposed on one side of a side mirror of the vehicle, and a wireless power receiver to receive power from the supply device 10 may be disposed on one side of the lower part (or upper part) of the vehicle. As another example, a wireless power receiver to receive power from the supply device 10 may be disposed on one side of the lower part (or upper part) of the vehicle, and a wireless power receiver to receive power from another vehicle in front of the vehicle may be disposed at the center of the front bumper of the vehicle. Also, a wireless power transmitter to transmit power to another vehicle behind the vehicle may be disposed at the center of the rear bumper of the vehicle, and an integrated transceiver may be disposed on one side of the left/right side mirror of the vehicle.

According to the above-described embodiments, a vehicle equipped with the EV charging device 20 according to the present disclosure may be implemented to flexibly configure a longitudinal and/or lateral wireless charging chain.

The EV charging device 20 may control at least one switch corresponding to the wireless power transmitter and the wireless power receiver to turn on/off the operations of the wireless power transmitter and the wireless power receiver.

According to an embodiment, the EV charging device 20 of a first vehicle may be operatively connected to the EV charging device 20 provided in a second vehicle to divide and transmit wireless power to the second vehicle. In this case, the amount of power by which the first vehicle and the second vehicle are to be charged may be dynamically determined based on the battery charge level of each vehicle.

The EV charging device 20 according to the embodiment may determine whether power relay to another vehicle is allowed, based on the battery charge level of the RESS 40. For example, when the battery charge level (or battery output voltage) of the first vehicle is greater than or equal to a predetermined reference value, the EV charging device 20 of the first vehicle may transmit the power received from the supply device 10 to the EV charging device 20 of the second vehicle. On the other hand, when the battery charge level (or battery charge voltage) of the first vehicle is less than the predetermined reference value, the EV charging device 20 of the first vehicle may control the power received from the supply device 10 not to be relayed to the EV charging device 20 of the second vehicle.

A vehicle terminal may be connected to another vehicle terminal or a base station (or a road side unit (RSU)) to exchange various kinds of information.

V2X refers to a communication technology for exchanging information with other vehicles, pedestrians, and infrastructure-built objects through wired/wireless communication. V2X may be divided into four types: vehicle-to-vehicle (V2V) for vehicle-to-vehicle communication; vehicle-to-infrastructure (V2I) for communication between a vehicle and infrastructure; vehicle-to-network (V2N) for communication between a vehicle and a communication network; and vehicle-to-pedestrian (V2P) for communication between a vehicle and a pedestrian. V2X communication may be provided via a PC5 interface and/or a Uu interface.

Sidelink (SL) is a communication scheme that establishes a direct wireless link between vehicle terminals to enable direct exchange of information between the vehicle terminals without intervention of a base station (BS) or infrastructure (for example, RSU). SL is considered as a way to alleviate the burden on the BS according to the rapidly increasing amount of data traffic and to minimize the transmission delay in vehicle-to-vehicle communication.

Figure 2:
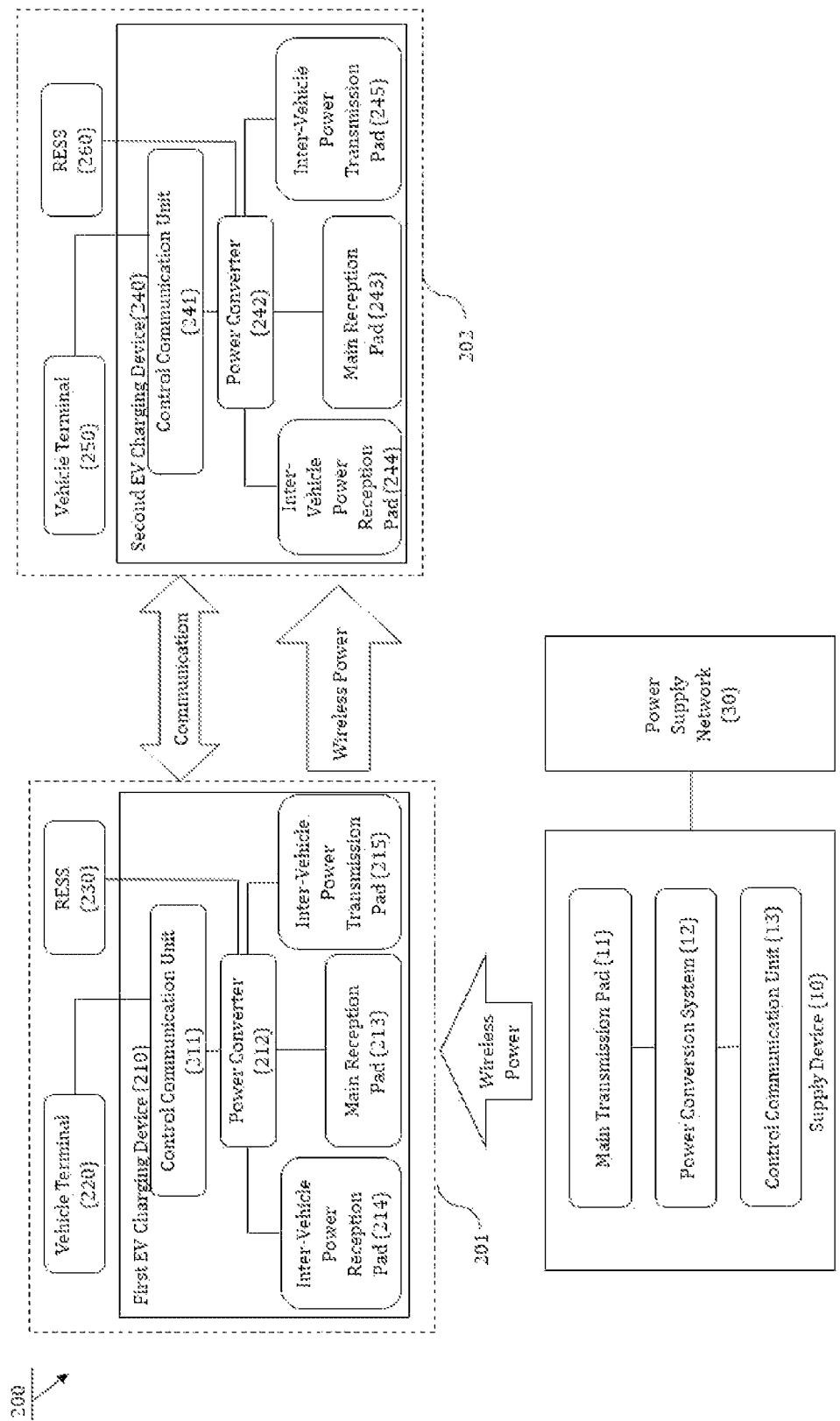
FIG. 2 is a diagram illustrating a detailed structure of an electric vehicle wireless charging system according to an embodiment.

FIG. 2 is a diagram illustrating a detailed structure of an electric vehicle wireless charging system according to an embodiment.

Specifically, FIG. 2 illustrates a detailed structure of an electric vehicle wireless charging system for providing a lateral wireless charging chain and a procedure of configuring a lateral wireless charging chain therethrough.

Referring to FIG. 2, an electric vehicle the electric vehicle wireless charging system 200 may include a supply device 10, a power supply network 30, a first electric vehicle 201, and a second electric vehicle 202. In the embodiment of FIG. 2, the configuration of a lateral wireless charging chain for two electric vehicles is described as an example, but this is merely one embodiment. The number of electric vehicles constituting the lateral wireless charging chain may be greater than or equal to 2. The maximum number of electric vehicles that can participate in the configuration of the lateral wireless charging chain according to one supply device 10 may be predefined or may be adaptively determined according to the battery charge level (and/or the battery output voltage) of the electric vehicles participating in the lateral wireless charging chain.

The first and second electric vehicles 201 and 202 may be equipped with an EV charging device 210, 240, respectively. The first electric vehicle 201 may receive wireless power from the supply device 10 via the first EV charging device 210 in a manner of electromagnetic induction. The first EV charging device 210 may transmit a portion (or entirety) of the power received from the supply device 10 to the second EV charging device 240 via the inter-vehicle wireless power transmission pad according to a request from the second EV charging device 240. As an example, the first EV charging device 210 may dynamically determine whether to transmit wireless power to the second EV charging device 240 and the magnitude and/or amount of transmitted power based on a battery charge level (or battery output voltage) of a RESS 230 of the first EV charging device 210 and a battery charge level (or battery output voltage) of a RESS 260 of the second electric vehicle 260.

Referring to FIG. 2, each of the first and second EV charging devices 210 and 240 may include a control communication unit 211, 241, a power converter 212, 242, a main reception pad 213, 243, and an inter-vehicle power reception pad 214, 244, and an inter-vehicle power transmission pad 215, 245.

The control communication units 211 and 241 may control input/output and overall operation of the corresponding EV charging devices, and may communicate with external device(s). As an example, the control communication unit 211 of the first EV charging device 210 may transmit and receive various kinds of control signals and state information to and from the control communication unit 241 of the second EV charging device 240 through in-band (or out-of-band) communication. In addition, the control communication unit 211 may transmit and receive various kinds of control signals and state information to and from the vehicle terminal 220 over an in-vehicle communication network. Here, the state information transmitted between the EV charging devices may include, but is limited to, information about a battery charge level and information about a battery output voltage. In an embodiment, information about a battery charge level of each electric vehicle and information about a battery output voltage may be exchanged through communication between vehicle terminals.

The control communication unit 211 may acquire information about the current location of the second electric vehicle 202 and capability information about the second electric vehicle 202 via the vehicle terminal 220. Here, the vehicle terminal 220 of the first electric vehicle 201 may be connected to the vehicle terminal 250 of the second electric vehicle 202 through V2X communication or the like to exchange various kinds of information. Here, the capability information may include information about whether the corresponding electric vehicle is capable of inter-vehicle wireless charging. When the corresponding electric vehicle is capable of wireless charging between vehicles, the capability information may include identification information about whether the vehicle is capable of constituting a longitudinal wireless charging chain or a lateral wireless charging chain. However, embodiments are not limited thereto.

The control communication unit 211 may exchange various kinds of control signals and state information with the control communication unit 13 of the supply device 10 through in-band (or out-of-band) communication.

When the main reception pad 213 of the first electric vehicle 201 is aligned with the main transmission pad 11, the control communication unit 13 of the supply device 10 may convert the power supplied from the power supply network 30 into power required by the first electric vehicle 201. Thereafter, the converted power may be transmitted to the main reception pad of the first electric vehicle 201 via the main transmission pad 11 in a manner of electromagnetic induction.

In an embodiment, the control communication unit 13 of the supply device 10 may transmit the location information about the main transmission pad 11 (for example, lane information, a location in the lane, etc.) to a vehicle terminal (or a control communication unit) of an adjacent electric vehicle through V2X communication (or short-range wireless communication). In addition, the control communication unit 13 of the supply device 10 may provide a vehicle terminal (or control communication unit) of an adjacent electric vehicle with information about whether wireless charging is currently being performed, information about the amount of available power (and/or amount of charge), information about the types of chargeable vehicles, information about the number of electric vehicles that can be additionally charged (or information about the number of electric vehicles constituting the current lateral wireless charging chain), etc.

In an embodiment, detailed information about the supply device 10 including the location information about the main transmission pad 11 may be provided through a vehicle navigation system. The vehicle navigation system may periodically receive supply device update information from the server to maintain the latest information about the supply device.

When the second electric vehicle 202 approaches the first electric vehicle 201 within a predetermined distance, the control communication unit 211 may establish a short-range wireless communication connection with the second EV charging device 240. Here, the short-range wireless communication may be in-band communication using a frequency band used for wireless power transmission or out-of-band communication using a separate frequency band different from the frequency band used for wireless power transmission. As an example, the out-of-band communication may include, but is not limited to, IEEE 802.11p communication, 4G LTE communication, and 5G New Radio (NR) mmWave communication. Alternatively, Bluetooth communication, radio frequency identification (RFID) communication, near field communication (NFC), infrared (IR)-dedicated short range communications (DSRC), or optical wireless communication (OWC) may be used.

The control communication unit 211 may adaptively select a short-range communication method based on communication capability information about an adjacent electric vehicle. In this case, the capability information may include information about a communication scheme supported by the vehicle terminal.

When wireless power transmission to the second electric vehicle 202 is required, the control communication unit 211 may generate an alternating current (AC) power required by the second electric vehicle 202 through the power converter 212 and output the generated power through the inter-vehicle power transmission pad 215. The second EV charging device 240 may receive the wireless power signal generated by the first electric vehicle 201 as output through the inter-vehicle power reception pad 244. The AC power received through the inter-vehicle power reception pad 244 may be converted into power required by the RESS 260 by the power converter 242 to charge the battery.

Figure 3:
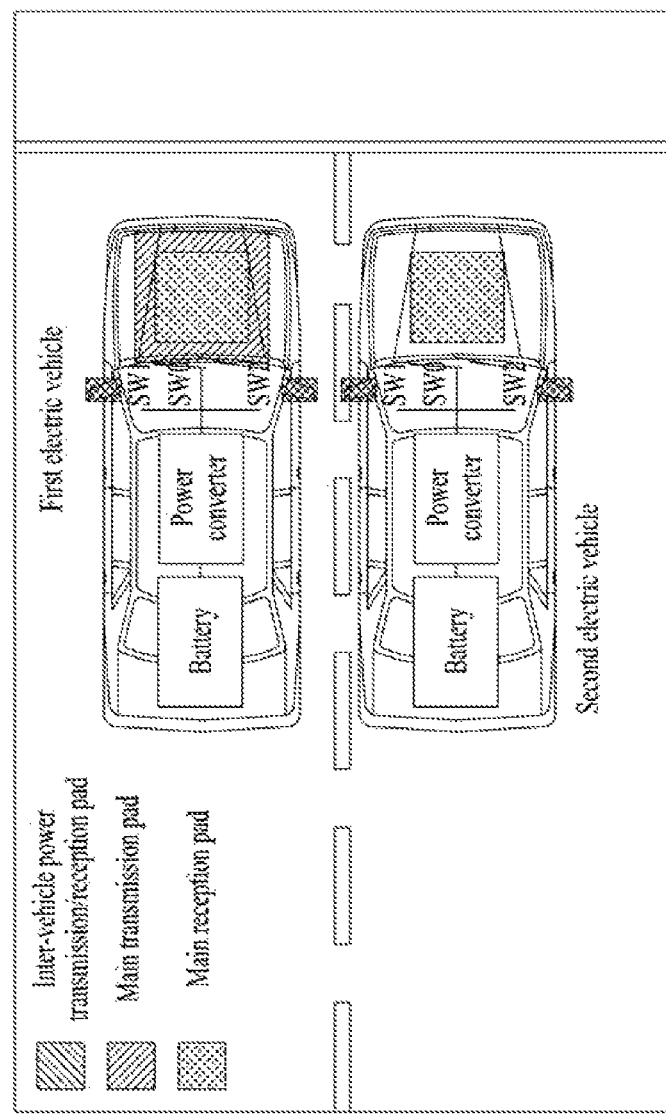
FIG. 3 is a configuration diagram of a lateral wireless charging chain according to an embodiment.

FIG. 3 is a configuration diagram of a lateral wireless charging chain according to an embodiment.

The method of configuring a lateral wireless charging chain according to the present disclosure may be provided as an alternative to solve the insufficient supply of wireless charging facilities for electric vehicles.

As shown in FIG. 3, each electric vehicle may include a main reception pad, first and second inter-vehicle power transmission/reception pads mounted on one side of the left/right side mirrors, a power converter, and a battery.

Referring to FIG. 3, when the first electric vehicle detects the main reception pad of the supply device disposed on the road surface, it may close a first switch SW0 to align the main transmission pad and the main reception pad. When the alignment of the main transmission and reception pads between the supply device and the first electric vehicle is completed, the supply device may determine the amount of transmission power through negotiation for power with the first electric vehicle, perform AC power conversion according to the determined amount of power, and transmit wireless power to the main reception pad of the first electric vehicle.

The power converter of the first electric vehicle may charge the battery by converting the power received via the main reception pad into power required by the battery of the first electric.

As shown in FIG. 3, when the second electric vehicle approaches the lane on the right side of the first electric vehicle that is being charged, the second electric vehicle may align the right inter-vehicle power transmission/reception pad of the first electric vehicle with the left inter-vehicle power transmission/reception pad of the second electric vehicle using various sensors provided therein. That is, the first electric vehicle and the second electric vehicle may configure a lateral wireless charging chain through alignment of the inter-vehicle power transmission/reception pads.

When the right inter-vehicle power transmission/reception pad of the first electric vehicle and the left power transmission/reception pad of the second electric vehicle are aligned and the second electric vehicle is stopped, the first electric vehicle may close a third switch SW2 to control the power required by the second electric vehicle to be transmitted to the left inter-vehicle power transmission/reception pad of the second electric vehicle through the right inter-vehicle power transmission/reception pad of the first electric vehicle. In this case, a second switch SW1 of the second electric vehicle may be turned on, and thus the power received via the left inter-vehicle power transmission/reception pad may be transmitted to the power converter of the second electric vehicle. The power converter of the second electric vehicle may convert the power into power required by the battery of the second electric vehicle to charge the battery.

At this time, the power converter of the first electric vehicle may distribute the wireless power received from the supply device based on the battery charge level (and/or battery output level) thereof, and then perform the operation of charging the battery thereof and the operation of supplying power to the second electric vehicle simultaneously using the distributed power.

Of course, the first electric vehicle may cut off relayed supply of the wireless power to the second electric vehicle based on the charge level of the battery thereof and/or the charge level of the battery of the second electric vehicle.

After the lateral wireless power transmission chain is configured, the first electric vehicle may provide the supply device (or a specific charge bill server) with information about the amount of wireless power provided to the second electric vehicle. Here, the information provided to the supply device (or a specific fee charge server) may be used to charge fees for the first electric vehicle and the second electric vehicle.

Figure 4:
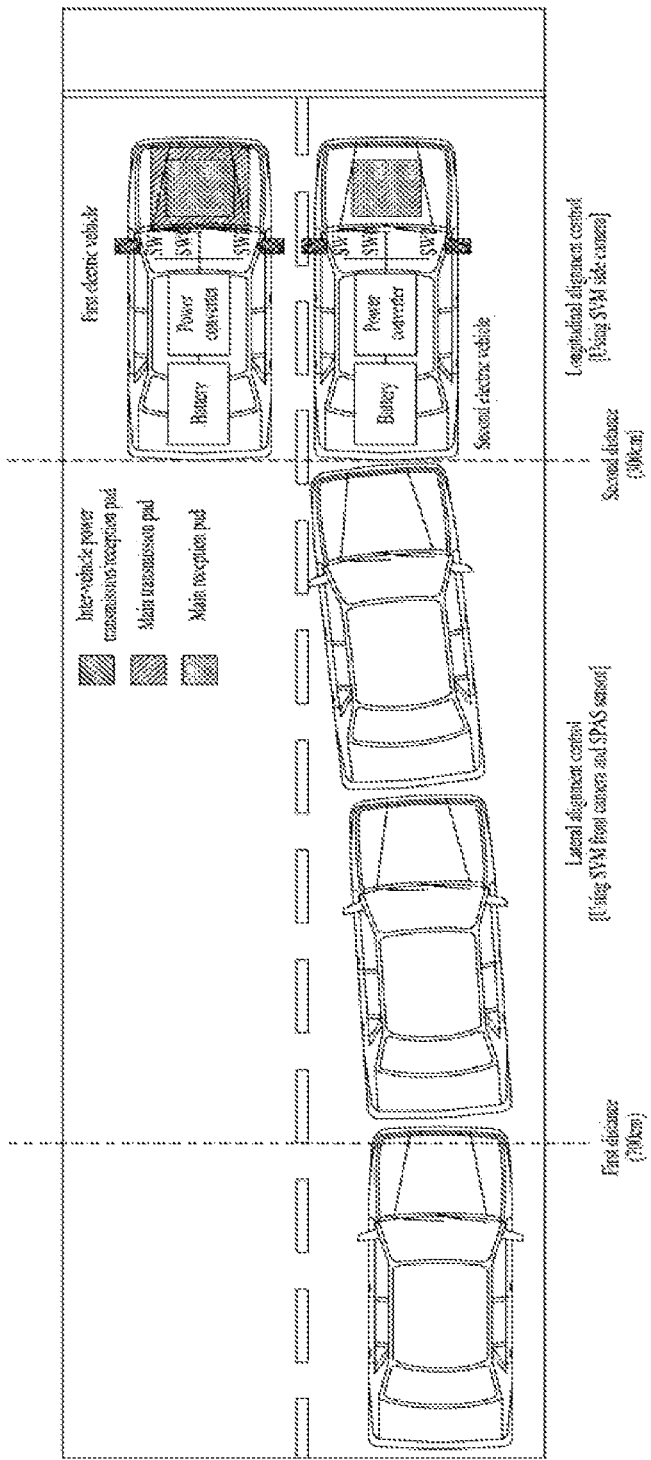
FIG. 4 illustrates a method of aligning, by electric vehicles, inter-vehicle power transmission/reception pads to configure a lateral charging chain in according to an embodiment.

FIG. 4 illustrates a method of aligning, by electric vehicles, inter-vehicle power transmission/reception pads to configure a lateral charging chain in according to an embodiment.

In order to increase the power transmission/reception efficiency of the wireless charging chain, the inter-vehicle power transmission/reception pads should be aligned at a minimum distance.

When the distance to the first electric vehicle that is stopped for wireless charging is within a first distance, the second electric vehicle that is traveling may perform lateral alignment control using a surround view monitor (SVM) front camera and a smart parking assistance system (SPAS) sensor provided therein. For example, the first distance may be set to 700 cm, but this is merely one embodiment. The first distance may be adaptively set according to the vehicle travel speed, weather, temperature, time zone, and the like.

The second electric vehicle may perform lateral alignment control by calculating the position and angle of the vehicle by processing an image captured by the SVM front camera according to a predetermined image processing technique. As an example, the image captured by the SVM front camera may be input to a deep learning-based semantic segmentation network to calculate the position and angle of the vehicle.

Also, in order to prevent a collision with the first electric vehicle during the lateral alignment control, the second electric vehicle may change the number of transmission (drive) pulses of the SPAS sensor.

The second electric vehicle may perform a control operation to reduce the number of drive pulses of the SPAS sensor during the lateral alignment control to enable short-distance obstacle detection. In other words, by reducing the number of drive pulses of the SPAS sensor, the position of a vehicle on a side may be identified even below the short-distance measurement limit of the existing SPAS sensor, and the position of the host vehicle may be controlled. Accordingly, a lateral collision of the vehicle may be effectively prevented, and lateral access may be made at the minimum distance to the measured vehicle. Thereby, wireless charging efficiency may be maximized. For example, when the inter-vehicle power transmission/reception pads are mounted on side mirrors, closed loop steering control may be performed without lateral collision until the lateral distance between the two vehicles becomes equal to the sum of the dimension of the side mirrors of the two vehicles.

When the distance to the first electric vehicle falls within a second distance according to the lateral alignment control, the second electric vehicle may perform longitudinal alignment control using the SVM lateral camera. For example, the second distance may be set to 300 cm, but this is merely one embodiment. The second distance may be adaptively set according to the vehicle travel speed, weather, temperature, time zone, and the like.

The second electric vehicle may input an image captured by an SVM side camera to a deep learning-based semantic segmentation network to calculate side mirror pixels.

The second electric vehicle may align the inter-vehicle power transmission/reception pads between the first electric vehicle and the second electric vehicle by slowly moving in the longitudinal direction, such that the average lateral position of the side mirror pixels becomes the center of the image captured by the SVM side camera.

When the alignment of the inter-vehicle power transmission/reception pads is completed, the second electric vehicle may stop and receive wireless power from the first electric vehicle.

The SVM camera may be mounted on the front/rear/left side/right side of the vehicle to provide a wide view (by the front camera), a front top view (by the front/left/right cameras), a left side view (by the left camera), a right side view (by the right camera), a rear view (by the rear camera), or the like.

FIG. 5 illustrates a method of estimating the position and angle of a vehicle being wirelessly charged in the front based on an image captured by an SVM front camera according to an embodiment.

A bird's eye view of the SVM front camera image may be used to identify the location of the vehicle that is being wirelessly charged in the front.

Referring to FIG. 5-(*a*), an image captured by the SVM front camera may be transformed into a bird's eye view. Each pixel position in the image 510 transformed into a bird's eye view matches a physical distance in a manner of one-to-one correspondence. Accordingly, by estimating the position of the target vehicle in the image, the actual position of the vehicle may be identified.

A deep learning-based semantic segmentation network 520 may be used to classify image pixels.

When the image 510 transformed into a bird's eye view and a label image classified into vehicle/road/obstacle are input to the semantic segmentation network 520, an image in which the vehicle area is divided may be obtained as shown in the part assigned reference numeral 530.

For lateral alignment with a stopped vehicle that is being wirelessly charged, it is necessary to identify the angle of the stopped vehicle.

In order to identify the angle of the stopped vehicle, the maximum lateral pixel position (when the vehicle that is being wirelessly charged is on the left) or the minimum lateral pixel position (when the vehicle that is being wirelessly charged is on the right) of the pixels of the vehicle should be identified when the row direction in the image captured by the SVM front camera is defined as the x-axis.

As shown in FIG. 5-(*b*), when the vehicle being wirelessly charged is on the left side of the traveling direction of the host vehicle, it has two peaks due to the wheel area of the vehicle, and two inflection points where the inclination value changes from positive to negative may be extracted and the angle of the stopped vehicle may be obtained from the equation of a straight line connecting the two inflection points, that is, the slope of the straight line.

Figure 6:
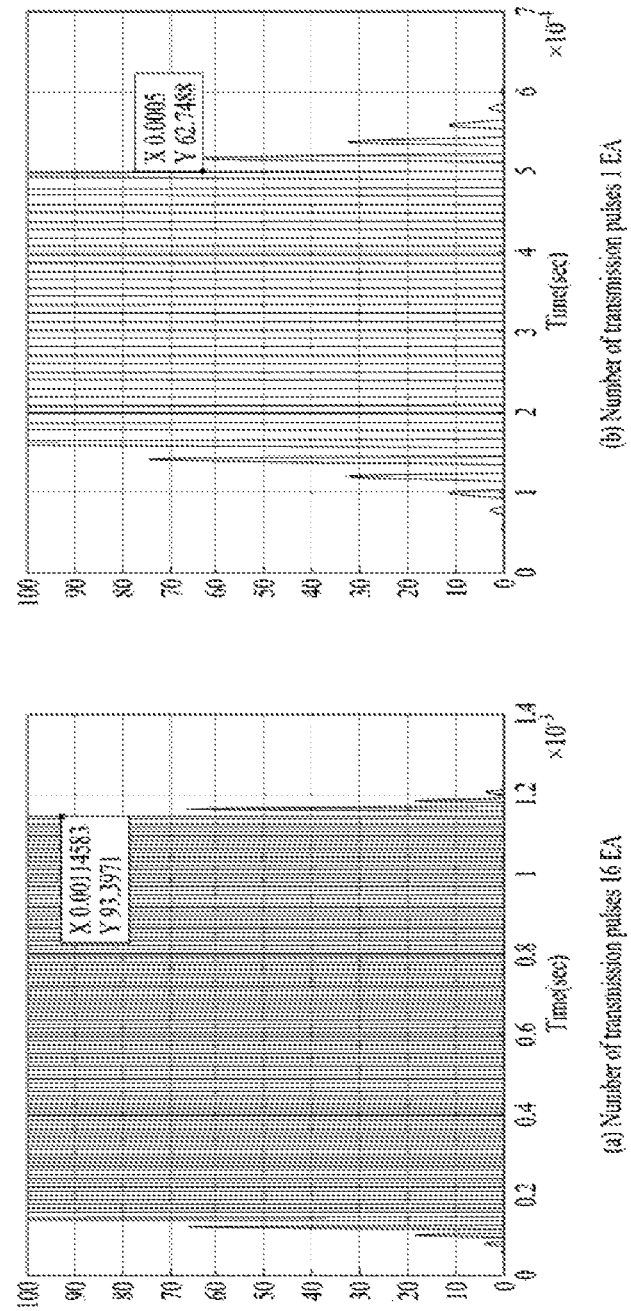
FIG. 6 shows waveforms according to the number of transmission (drive) pulses of an SPAS sensor according to an embodiment.

After the position and angle of the stopped vehicle are extracted, the traveling vehicle may reduce the number of transmission (drive) pulses of the SPAS sensor in order to minimize the lateral distance between the vehicles. As shown in FIG. 6-(*a*), which will be described later, a general SPAS sensor uses multiple (32) transmission pulses for long-distance obstacle detection. On the other hand, in the proposed method, the reverberation time is reduced and the short-range detection limit distance is shortened by setting the number of transmit pulses to the minimum (1) as shown in FIG. 6-(*b*). Thereby, the steering device may be adjusted to have the minimum distance between the inter-vehicle power transmission/reception pads without collision by continuously monitoring the lateral inter-vehicle distance during lateral alignment control based on the position and angle extracted for the stopped vehicle.

FIG. 6 shows waveforms according to the number of transmission (drive) pulses of an SPAS sensor according to an embodiment.

FIG. 6-(*a*) shows a reverberation waveform obtained when the number of transmission pulses of the SPAS sensor is 32 EA, and FIG. 6-(*b*) shows a reverberation waveform obtained when the number of transmission pulses of the SPAS sensor is 1 EA.

The traveling vehicle according to the present disclosure may reduce the number of transmission pulses of the SPAS sensor to a minimum so as to maintain a minimum lateral distance from a stopped vehicle for wireless charging.

Figure 7:
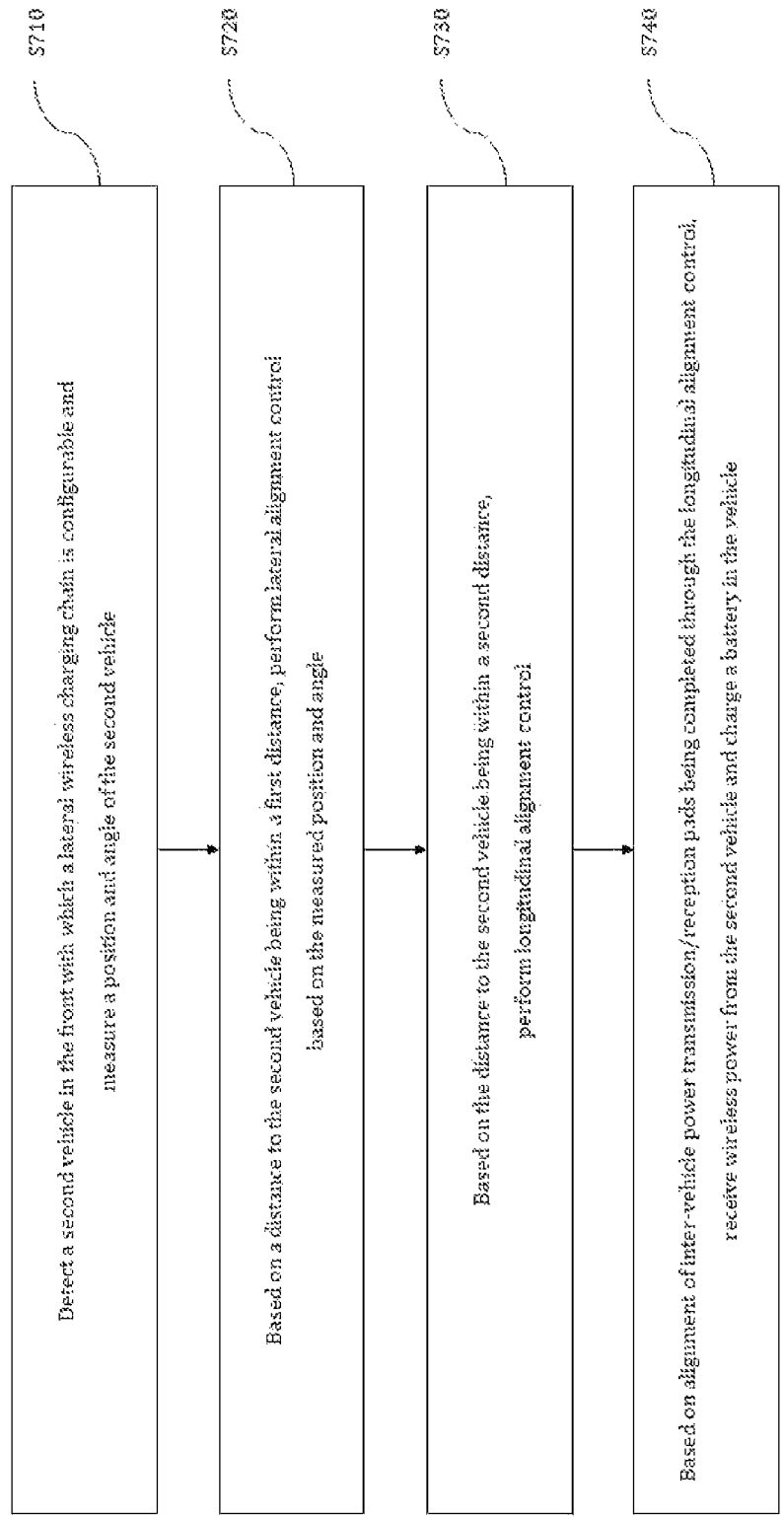
FIGS. 7 to 9 are flowcharts illustrating methods of configuring a lateral wireless charging chain according to embodiments.

FIG. 7 is a flowchart illustrating a method of configuring a lateral wireless charging chain according to an embodiment.

Referring to FIG. 7, a first vehicle that is traveling may detect a second vehicle in the front with which a lateral wireless charging chain is configurable and measure the position and angle of the second vehicle (S710). As an example, the first vehicle may analyze an image from the SVM front camera to measure the position of the second vehicle that is stopped for wireless charging and to measure the stopping (or parking) angle of the second vehicle based on the maximum (or minimum) inflection point of the vehicle pixels.

Based on a distance to the second vehicle being within a first distance, the first vehicle may perform lateral alignment control based on the measured position and angle (S720). As an example, the lateral alignment control may be performed using the SVM front camera and the SPAS sensor.

The first vehicle may perform longitudinal alignment control based on the distance from the second vehicle being within a second distance (S730). As an example, the longitudinal alignment control may be performed using an SVM side camera.

Based on alignment of inter-vehicle power transmission/reception pads being completed through the longitudinal alignment control, the first vehicle may receive wireless power from the second vehicle and charge a battery of the vehicle (S740).

Figure 8:
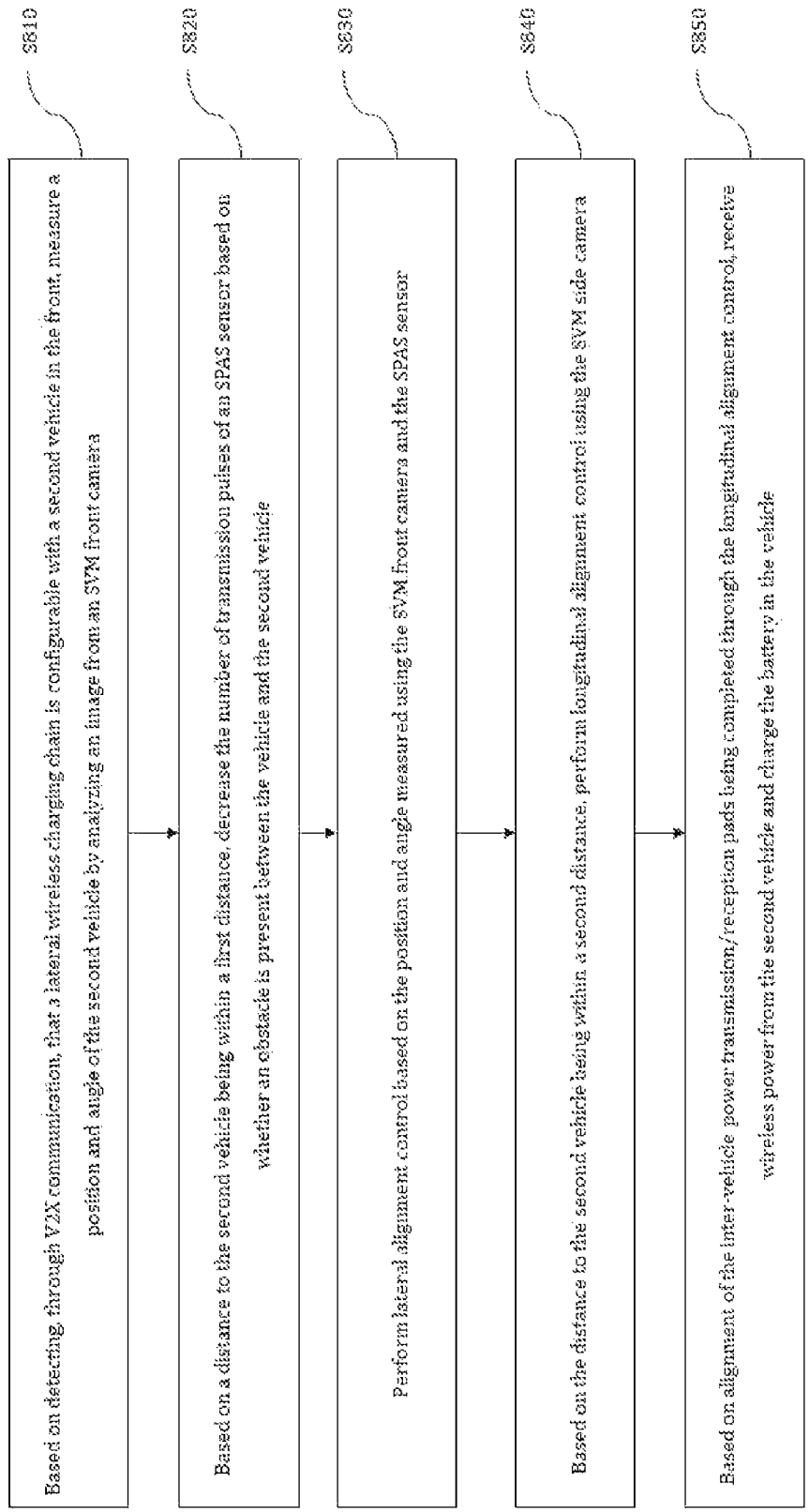

FIG. 8 is a flowchart illustrating a method of configuring a lateral wireless charging chain according to another embodiment.

Referring to FIG. 8, when a first vehicle that is traveling detects, through V2X communication, a second vehicle in front with which a lateral wireless charging chain is configurable, it may measure a position and angle of the second vehicle by analyzing an image from an SVM front camera (S810). For example, the first vehicle may classify pixels for each object through machine learning of the image of the SVM front camera, measure the position of the second vehicle that is stopped (or parked) for wireless charging, and determine the stopping (or parking) angle of the second vehicle based on the maximum (or minimum) inflection point of the vehicle pixels. That is, the stopping (or parking) angle of the second vehicle may be measured based on the slope of a straight line connecting the maximum (or minimum) inflection points of the vehicle pixels.

Based on the distance to the second vehicle being within a first distance, the first vehicle may decrease the number of transmission pulses of an SPAS sensor based on whether an obstacle is present between the first vehicle and the second vehicle (S820). As an example, the number of transmission pulses of the SPAS sensor may be changed to a minimum value. As an example, the minimum value may be 1, but this is merely one embodiment. The minimum value may be adaptively set based on the specifications of the SPAS sensor provided in the first vehicle, weather, temperature, time zone, travel speed, and the like.

The first vehicle may perform lateral alignment control based on the position and angle measured using the SVM front camera and the SPAS sensor (S830).

Based on the distance to the second vehicle being within a second distance, the first vehicle may perform longitudinal alignment control using the SVM side camera (S840). As an example, when the distance to the vehicle in the front is within a certain distance (e.g., 3 m), the first vehicle may perform longitudinal alignment control using the SVM side camera because the whole vehicle in the front is not observed through the SVM front camera.

Based on alignment of the inter-vehicle power transmission/reception pads being completed through the longitudinal alignment control, the first vehicle may receive wireless power from the second vehicle and charge the battery in the vehicle (S850). As an example, the inter-vehicle power transmission/reception pad may be mounted on a side-view mirror of each vehicle. Also, when the side-view mirror of the first vehicle approaches the side-view mirror of the second vehicle by a minimum distance, and thus the inter-vehicle power transmission/reception pads are aligned, the first vehicle may receive wireless power through negotiation with the second vehicle.

Figure 9:

FIG. 9 is a flowchart illustrating a method of configuring a lateral wireless charging chain according to another embodiment.

Referring to FIG. 9, a first vehicle may receive capability information about an adjacent vehicle through V2X communication and identify that a lateral wireless charging chain is configurable with a second vehicle stopped (or parked) in the front (S910).

The first vehicle may transform an image from an SVM front camera into a bird's eye view image and classify objects in a pixel level by inputting the transformed image to a semantic segmentation network for machine learning (first object classification) (S920). Here, the classified objects may include, but are not limited to, a vehicle, a road, a road bump, a lane, a pedestrian, a pillar, an obstacle, and a parking line.

The first vehicle may measure a position and angle of the second vehicle based on a result of the first object classification (S930). Here, for the detailed method of measuring the position and angle of the second vehicle, refer to the description given above.

The first vehicle may start calculating a distance to the identified second vehicle using the SVM front camera and LiDAR (S940).

Base on the distance to the second vehicle being within a first distance, the first vehicle may determine whether an obstacle is present between the first vehicle and the second vehicle based on the result of the first object classification (S950).

The first vehicle may change the number of transmission pulses of an SPAS sensor based on the absence of the obstacle (S960). Here, the number of transmission pulses of the SPAS sensor may be changed to a settable minimum number of pulses, but this is merely one embodiment. The number of transmission pulses may be set adaptively based on the specifications of the SPAS sensor provided in the first vehicle, weather, temperature, time zone, travel speed, and the like.

The first vehicle according to the embodiment may measure a reverberation time corresponding to the changed number of drive pulses of the SPAS sensor, and set a short-range detection limit distance of the SPAS sensor based on the measured reverberation time.

The first vehicle may perform lateral alignment control through steering control based on the measured position and angle of the second vehicle (S970). In an embodiment, the first vehicle may perform the lateral alignment control until the sum of the dimension of the side-view mirror of the first vehicle and the dimension of the side-view mirror of the second vehicle reaches the short-range detection limit distance.

Based on the distance to the second vehicle being within a second distance, the first vehicle may input an image from the SVM side camera to a semantic segmentation network and classify objects in a pixel level (second object classification) (S980). Here, the classified objects may include, but are not limited to, a vehicle body, a side-view mirror, a tire, a wheel, and a road.

Based on inter-vehicle power transmission/reception pads being mounted on the side-view mirrors of the respective vehicles, the first vehicle may calculate a lateral average position u of the side-view mirror pixels based on a result of the second object classification, and then perform longitudinal alignment control by comparing u with a lateral resolution center of the image from the SVM side camera, that is, ½ of the lateral resolution of the SVM side camera (S990). As an example, when u is greater than ½ of the lateral resolution, the first vehicle may be controlled to move rearward. When u is less than or equal to ½ of the lateral resolution, the first vehicle may be controlled to move forward. In an embodiment, the first vehicle may display a longitudinal control target position through the provided display, and the driver may perform forward/rearward movement control according to the longitudinal control target position displayed on the display. When the alignment of the inter-vehicle power transmission/reception pads is completed, the first vehicle may display a corresponding notification message on the display.

In an embodiment, a machine learning-based semantic segmentation network may be used to recognize the position of the side-view mirror in the image from the SVM side camera. The semantic segmentation network may receive the image from the SVM side camera as an input and classify pixels into a vehicle body, a side-view mirror, and a road.

For example, when the first vehicle supports an autonomous driving mode, the first vehicle may switch the driving mode from the driver mode to the autonomous driving mode (or semi-autonomous driving mode) based on the vehicle being within a first distance. After entering the autonomous driving mode (or semi-autonomous driving mode), the first vehicle may sequentially and automatically perform the above-described lateral control and longitudinal control without intervention of the driver to align the inter-vehicle power transmission/reception pads.

Based on the inter-vehicle power transmission/reception pads being aligned through the longitudinal alignment control, the first vehicle may receive wireless power from the second vehicle through negotiation with the second vehicle and charge the battery therein (S995).

In an embodiment, the first vehicle may acquire information about a dimension of the side-view mirror of the second vehicle through V2X communication. The information about the dimension of the side-view mirror of the second vehicle may be included in the above-described capability information about the second vehicle and received by the first vehicle.

Figure 10:
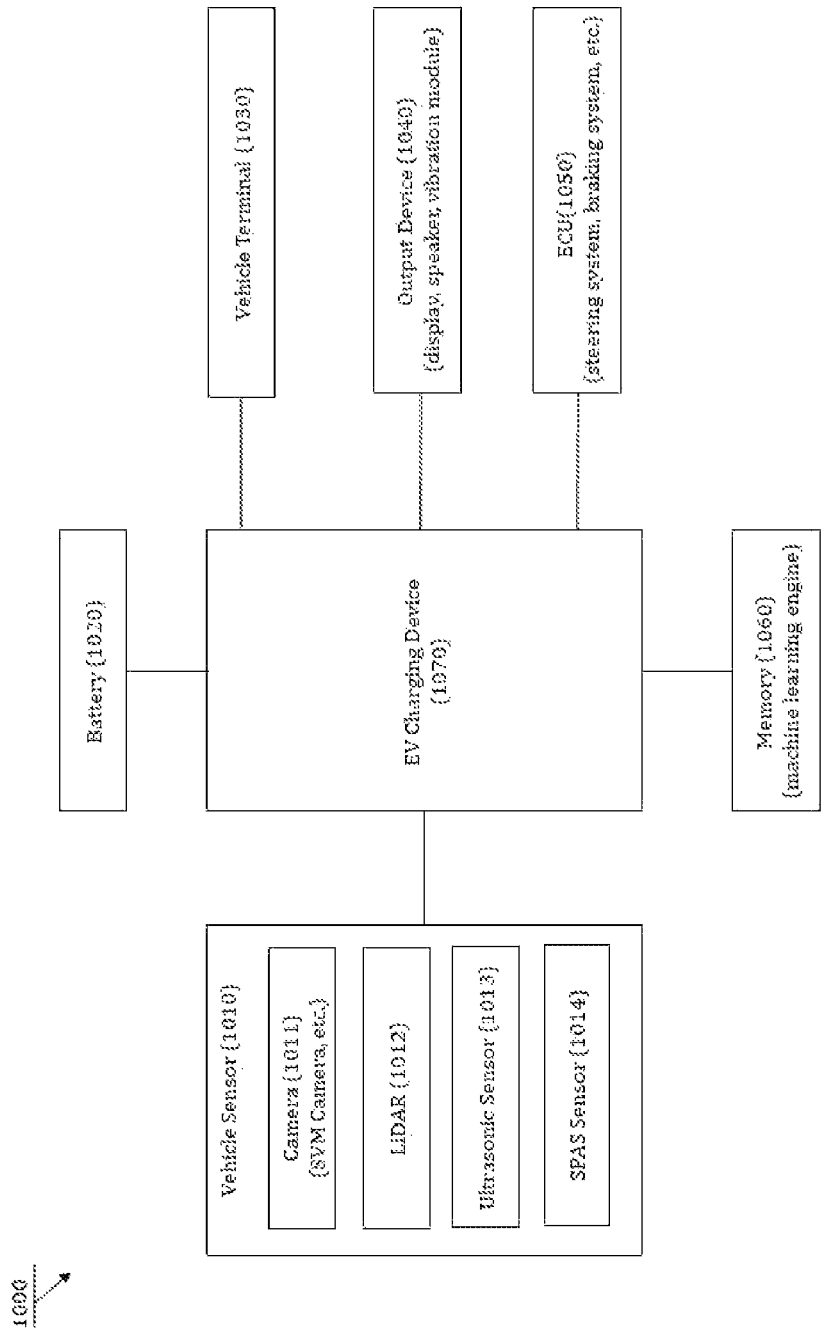
FIG. 10 is a block diagram illustrating a configuration of an electric vehicle according to an embodiment.

FIG. 10 is a block diagram illustrating a configuration of an electric vehicle according to an embodiment.

Referring to FIG. 10, an electric vehicle 1000 may include a vehicle sensor 1010, a battery 1020, a vehicle terminal 1030, an output device 1040, an electric control unit (ECU) 1050, a memory 1060, and an EV charging device 1070.

The vehicle sensor 1010 may include, but is not limited to, at least one of a camera 1011, a LiDAR 1012, an ultrasonic sensor 1013, or an SPAS sensor 1014. It may further include radar. According to an embodiment, the camera 1011 may include an SVM camera. The SVM camera may include a front camera, a left/right side-view camera, and a rear camera.

The vehicle sensor 1010, the vehicle terminal 1030, the output device 1040, and the ECU 1050 may be connected to the EV charging device 1070 over an in-vehicle communication network. Here, the in-vehicle communication network may include, but is not limited to, a controller area network (CAN), a local interconnect network (LIN), a FlexRay, and a media oriented systems transport (MOST) communication network.

The EV charging device 1070 may detect (or identify) another parked (or stopped) vehicle in front with which a lateral wireless charging chain is s configurable during driving. The EV charging device 1070 may collect various kinds of information about other nearby vehicles through V2X communication using the vehicle terminal 1030, and detect (or identify) the other vehicle with which the lateral wireless charging chain is configurable based on the collected information. An example, the information collected from the other vehicle may include, but is not limited to, information about the current location of the vehicle, information about the vehicle type, information about whether a lateral wireless charging chain is configurable, information about a position where an inter-vehicle power transmission/reception pad is mounted, information about whether wireless charging is being performed, information about a battery charge level, and information about a dimension of a side-view mirror.

The EV charging device 1070 may measure the stopped (or parked) position and angle of the other vehicle with which the lateral wireless charging chain is configurable. As an example, the EV charging device 1070 may transform an image from the SVM front camera into a bird's eye view image and classify objects in a pixel level by inputting the transformed image to a semantic segmentation network. The EV charging device 1070 may measure a position and angle of the other vehicle based on a result of the object classification. For a specific method of measuring the position and angle of the other vehicle by the EV charging device 1070, refer to the description of the drawings given above.

The EV charging device 1070 may calculate a distance to the other vehicle with which the lateral wireless charging chain is configurable. As an example, the EV charging device 1070 may calculate the distance to the other vehicle in operative connection with at least one of an SVM front camera, an SPAS sensor, an ultrasonic sensor, and LiDAR.

Based on the calculated distance being within a first distance, the EV charging device 1070 may determine whether an obstacle is present between the vehicle thereof and the other vehicle based on the result of the object classification.

Based on absence of the obstacle between the vehicle and the other vehicle, the EV charging device 1070 may decrease a short-range measurement limit distance by attenuating and adjusting the number of transmission pulses of the SPAS sensor. As an example, the EV charging device 1070 may decrease the number of transmission pulses of the SPAS sensor to a minimum value (1 EA).

The EV charging device 1070 may perform lateral alignment control based on the measured position and angle. As an example, the EV charging device 1070 may perform steering control based on the measured position and angle to control a lateral distance between the vehicle and the other vehicle to reach a short-range measurement limit distance.

Based on the distance to the other vehicle being within a second distance, the EV charging device 1070 may drive the SVM side camera.

The EV charging device 1070 may input an image from the SVM side camera to the machine learning engine, that is, a semantic segmentation network installed in the memory 1060 and classify objects in a pixel level. Here, the classified objects may include a vehicle bod/a side-view mirror/a tire/a wheel of the other vehicle and a road.

Based on the inter-vehicle power transmission/reception pads being mounted on the side-view mirror of the respective vehicles, the EV charging device 1070 may calculate an average lateral position u of the side-view mirror pixels based on the result of the object classification for the image from the SVM side camera, and then perform longitudinal alignment control of the vehicle by comparing u with the lateral resolution center of the image from the SVM side camera.

As an example, based on u being greater than ½ of a lateral resolution, the EV charging device 1070 may control the vehicle to move rearward in operative connection with a steering system. Based on u being less than ½ of the lateral resolution, EV charging device 1070 may control the vehicle to move forward in operative connection with the steering system.

In an embodiment, the EV charging device 1070 may display the longitudinal control target position through a display provided in the vehicle, and the driver may perform forward/rearward movement control according to the longitudinal control target position displayed on the display. When the alignment of the inter-vehicle power transmission/reception pads is completed through the longitudinal alignment control, the EV charging device 1070 may output a corresponding notification message through the output device 940.

When the alignment of the inter-vehicle power transmission/reception pads is completed, the EV charging device 1070 may receive wireless power through negotiation with an EV charging device of the other vehicle and charge the battery 1020 therein.

While it has been described in the above embodiment that the traveling vehicle classifies objects through analysis of an image from the SVM measurement camera and performs longitudinal alignment control with the other vehicle based on the average lateral position of the side-view mirror among the classified objects, this is merely one embodiment. An object serving as a reference for longitudinal alignment control may be different from the position where an inter-vehicle power transmission/reception pad is mounted in the vehicle. For example, a specific object serving as a reference for longitudinal alignment control may be set as a side door, a tire wheel, or the like according to a position where the inter-vehicle power transmission/reception pad is mounted.

The EV charging device described in relation to the embodiments disclosed in the present disclosure may include at least one transceiver configured to transmit and receive signals to and from a vehicle display, a vehicle terminal and various ECUs connected over the in-vehicle communication network, external network equipment connected over an external wired/wireless communication network, and an EV charging device of another vehicle, and a user device, at least one processor connected to the at least one transceiver to control the overall operation, and a memory having a program recorded thereon for an operation of the at least one processor.

The supply device described in relation to the embodiments disclosed in the present disclosure may include a first transceiver configured to transmit and receive signals to and from the EV charging device through in-band (or out-of-band) communication, and receives power from the power supply network, a second transceiver configured to receive power from a power supply network and transmit and receive various kinds of control signals to and from the power supply network, at least one processor connected to the first and second transceivers to control the overall operation, and a memory having a program recorded thereon for the operation of the processor.

Steps in a method or algorithm described in relation to the embodiments disclosed herein may be directly implemented in hardware, a software module, or a combination of the two, executed by a processor. The software module may reside in a storage medium (i.e., a memory and/or storage) such as a RAM, a flash memory, a ROM, an EPROM, an EEPROM, a register, a hard disk, a removable disk, or a CD-ROM.

An exemplary storage medium may be coupled to the processor, the processor may read information from, and write information to, the storage medium. Alternatively, the storage medium may be integrated with the processor. The processor and storage medium may reside within an application specific integrated circuit (ASIC). The ASIC may reside within the user terminal. Alternatively, the processor and storage medium may reside as separate components within the user terminal.

The above description is merely illustrative of the technical spirit of the present disclosure. It will be apparent to those skilled in the art that various modifications and variations can be made in the present disclosure without departing from the spirit and scope of the disclosure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of configuring a lateral wireless charging chain by a first vehicle, the method comprising:
    detecting a second vehicle in which a lateral wireless charging chain is configurable;
    calculating a distance to the second vehicle;
    performing, in response to the calculated distance being within a first distance, lateral alignment control with the second vehicle; and
    performing, in response to the calculated distance being within a second distance, longitudinal alignment control with the second vehicle,
    wherein the first distance is longer than the second distance.

2. The method of claim 1, further comprising:
    measuring a position and angle of the second vehicle using an image corresponding to a front view of the first vehicle, which is obtained by a camera system to capture images around the first vehicle,
    wherein the lateral alignment control with the second vehicle is performed based on the measured position and angle.

3. The method of claim 2, further comprising:
    transforming the image into a bird's eye view image and classifying an object in a pixel level by inputting the transformed image to a semantic segmentation network,
    wherein the position and the angle of the second vehicle are measured based on a result of the classification of the object.

4. The method of claim 3, wherein the angle of the second vehicle is determined based on a slope of a straight line connecting maximum or minimum inflection points of pixels of the second vehicle classified into the object.

5. The method of claim 3, further comprising:
    determining, based on the distance to the second vehicle being within the first distance, whether an obstacle is present between the first vehicle and the second vehicle based on the result of the classification of the object; and
    decreasing, based on absence of the obstacle, a number of transmission pulses of a smart parking assistance system (SPAS) sensor.

6. The method of claim 5, further comprising:
    measuring, based on the number of transmission pulses being decreased, a reverberation distance of the SPAS sensor; and
    setting a short-range measurement limit distance based on the reverberation distance.

7. The method of claim 1, wherein the distance to the second vehicle is measured using any one or any combination of any two or more of a camera system to capture images around the first vehicle, an ultrasonic sensor, and Light Detection and Ranging (LiDAR).

8. The method of claim 1, further comprising:
    inputting, based on the distance to the second vehicle being within the second distance, an image corresponding to a side view of the first vehicle, from a surround view monitor (SVM) side camera which is obtained by a camera system to capture images around the first vehicle, to a semantic segmentation network and classifying objects in a pixel level,
    wherein the longitudinal alignment control is performed by comparing a lateral average position of a specific object, among the classified objects, with a lateral resolution center of the image from the camera system SVM side camera.

9. The method of claim 8, wherein the performing of the longitudinal alignment control comprises:
    controlling, based on the lateral average position being greater than ½ of lateral pixels corresponding to the image, the first vehicle to move rearward; and
    controlling, based on the lateral average position being less than or equal to ½ of the lateral pixels corresponding to the image, the first vehicle to move forward.

10. The method of claim 1, wherein the specific object is an object equipped with an inter-vehicle power transmission/reception pad.

11. The method of claim 10, wherein the inter-vehicle power transmission/reception pad is mounted on one of a side-view mirror, a side door, or a tire wheel.

12. The method of claim 11, wherein, based on the inter-vehicle power transmission/reception pad being mounted on the side-view mirror, the lateral alignment control is performed until a distance between a side-view mirror of the first vehicle and a side-view mirror of the second vehicle reaches a short-range measurement limit distance.

13. The method of claim 1, further comprising:
acquiring information about the second vehicle through Vehicle to Everything (V2X) communication,
wherein the information about the second vehicle comprises any one or any combination of any two or more of information about a vehicle type, information about a current location, information about either one or both of a battery charge level and a battery output voltage, information about a position where an inter-vehicle power transmission/reception pad is mounted, information about whether either one or both of a lateral and longitudinal wireless charging chain is configurable with a target vehicle, and information about whether wireless charging is being performed.

14. The method of claim 1, further comprising:
receiving, based on inter-vehicle power transmission/reception pads of the first vehicle and the second vehicle being aligned through the longitudinal alignment control, wireless power through negotiation with the second vehicle and charging a battery provided in the first vehicle.

15. A non-transitory computer-readable storage medium storing instructions that, when executed by one or more processors, configure the one or more processors to perform operations for configuring a lateral wireless charging chain in a vehicle operatively connected to another vehicle over a communication network, the operations comprising:
detecting the other vehicle in which a lateral wireless charging chain is configurable;
calculating a distance to the other vehicle;
performing, in response to the calculated distance being within a first distance, lateral alignment control with the other vehicle; and
performing, in response to the calculated distance being within a second distance, longitudinal alignment control with the other vehicle,
wherein the first distance is longer than the second distance.

16. An electric vehicle configured for wireless charging, comprising:
a vehicle terminal configured to communicate with another vehicle;
a vehicle sensor comprising at least one sensor to measure a distance to the other vehicle, and a position and an angle of the other vehicle; and
an electric vehicle (EV) charging device configured to:
based on detecting in operative connection with the vehicle terminal that a lateral wireless charging chain is configurable with the other vehicle, calculate the distance to the other vehicle in operative connection with the vehicle sensor;
perform, in response to the distance to the other vehicle being within a first distance, lateral alignment control; and
perform, in response to the distance to the other vehicle being within a second distance, longitudinal alignment control,
wherein the first distance is longer than the second distance.

17. The electric vehicle of claim 16, wherein the vehicle sensor comprises any one or any combination of any two or more of a camera system to capture images around the first vehicle, Light Detection and Ranging (LiDAR), and an ultrasonic sensor, and
wherein the distance to the other vehicle is calculated using any one or any combination of any two or more of the camera system, the ultrasonic sensor, or the LiDAR.

18. The electric vehicle of claim 17, wherein the EV charging device is configured to:
measure the position and angle of the other vehicle using the SVM front camera system, and
perform the lateral alignment control with the other vehicle based on the measured position and angle.

* * * * *